July 16, 1963 A. PREISER 3,098,108
COALESCING SULPHURIC ACID-HYDROCARBON EMULSIONS
Filed Dec. 16, 1960 2 Sheets-Sheet 2

Aaron Preiser   Inventor
By Richard H. Nagel
Patent Attorney 3,098,108
COALESCING SULPHURIC ACID-HYDROCARBON
EMULSIONS
Aaron Preiser, Scotch Plains, N.J., assignor to Esso Research and Engineering Company, a corporation of Delaware
Filed Dec. 16, 1960, Ser. No. 76,380
12 Claims. (Cl. 260—683.62)

This invention relates to the separation of emulsions of liquid hydrocarbons and liquid catalyst into the emulsion constituents. It is particularly directed to an improved method for separating reaction product from acid catalyst in an emulsion alkylation process wherein branched chain hydrocarbons suitable as automotive and aviation fuel components are prepared by reaction of olefins with isoparaffinic hydrocarbons. Specifically, this invention concerns the use of an acid resistant material which is preferentially wet by hydrocarbons to break the emulsion and improve the settling rate of the emulsion.

In the alkylation of olefinic material with isoparaffins a particular problem that arises is that of preventing or minimizing the polymerization of the olefins or their degradation into sludge by contact with the alkylation catalyst. A desirable way to solve this problem is to conduct the catalytic alkylation reaction under conditions that are designed to avoid, as much as possible, intimate contact of the olefins with the catalyst material in the comparative absence of isoparaffins. This may be accomplished by providing a substantial excess of isoparaffins in the reaction zone and by introducing the olefinic material in successive increments into a continuous series of reaction zones or stages which contain previously emulsified mixtures of isoparaffin, alkylation catalyst and reaction products.

In conventional alkylation procedures product recovery is effected by withdrawing the emulsion from the reaction zone or zones and separating it into its hydrocarbon and liquid acid components. The separated hydrocarbon phase, which consists chiefly of alkylation product and unreacted paraffins, is sent to a product recovery system while the major portion of the separated acid is recycled to the reaction zones. As the emulsion separation step requires an appreciable period of time, if any olefins remain dissolved in the acid phase, they will undergo, in both the separation zone and the lines recycling the acid phase to the reaction zone, the competing polymerization and sludge forming reactions. Consequently, polymers comparatively low in octane number may find their way into the alkylate product, reducing the quality thereof. The sludge remains in the acid, and acid consumption is increased. It is thus desirable to perform the emulsion separating step as rapidly as possible in order to minimize the time during which there is a comparative absence of isoparaffins. Rapid separation and use of the full volume of the settler is also desirable to reduce the size of the settling equipment required for a given reactor throughput capacity. However, the settling operation can be run under conventional conditions wherein there is a vapor space provided in the settler above the emulsion being separated.

Various methods are known for separating hydrocarbon acid emulsions. One process is described in co-pending application Serial No. 15,242, filed March 15, 1960, assigned to applicant's assignee. In this process the settler is run about two-thirds full. In this settler, settling rate was increased by inverting the acid continuous emulsion to a hydrocarbon continuous emulsion. Other means for improving the settling rate of the emulsion have been used, for example, passing the emulsion through fine screens. This method, however, has the disadvantage of frequent plugging of the screens and upsetting of the process, and inefficient separation. The screen appear to mechanically coalesce small droplets of acid that are entrained in the hydrocarbon phase.

In an emulsion-type alkylation reaction it is desirable to operate the process with a very high proportion of acid in the reaction zone. It has been shown that in order to ensure stability of hydrocarbon-acid emulsions, the acid phase should make up at least half of the emulsion volume. Further, it is quite difficult to obtain homogeneous emulsions at reasonable power inputs in mixing zones containing less than about 60 percent acid. Thus, in order to assure smooth and efficient operations, the acid catalyst in the emulsion alkylation reactor should preferably make up 60 to 70 percent of the volume of the acid-hydrocarbon emulsion. The disadvantage, however, of high acid content emulsions is that they normally have low settling rates. This disadvantage is overcome in the present invention by contacting the acid continuous acid-hydrocarbon emulsion with polytetrahalogenatedethylene which preferentially wets the hydrocarbon and effectively separates the emulsion into its constituent parts.

One object of the present invention is to provide an improved process for separating the product emulsion rapidly so as to insure maximum yield and quality of the desired products. It is another object of the invention to provide an improved method for rapid and efficient separation of an emulsified mixture of hydrocarbon and liquid catalyst into its component parts wherein the full volume capacity of the settler is used. It is a further object of the invention to provide a material which is resistant to acid, oxygen, and chemical corrosion, and which is preferentially wet by hydrocarbons to be used to improve the settling rate of acid-hydrocarbon emulsions into their component parts. Still another object of this invention is to obtain efficient separation without having to invert the emulsion from acid continuous to hydrocarbon continuous.

It has now been unexpectedly found that certain polytetrahalogenatedethylene compounds that are resistant to acid, oxygen, and chemical corrosion are preferentially wet by hydrocarbons and when a pad of them of randomly selected sizes is contacted with an acid-hydrocarbon emulsion, the separation and settling rate is greatly improved.

In accordance with the present invention, the emulsion of acid and hydrocarbon that is to be separated into its components is charged to an emulsion receiving zone which zone is adjacent to and in communication with a zone which is packed with polytetrahalogenatedethylene material of random sized particles. The particles are packed in such a manner that they form a pad that has a minimum impedance to emulsion flow yet allows for maximum contact between the emulsion and the polytetrahalogenatedethylene pad. A pressure drop between the beginning and end of the pad of .1–10 p.s.i.g. is maintained in order that a linear velocity of .01 to 0.5 f.p.s. is obtained through the pad. In order to obtain efficient separation of the emulsified materials, a flow rate of 5 to 25 v./v./h. is used. After the emulsion has passed through the pad or pads into the quiescent zone, the emulsion has been separated into a lower acid phase which contains a minor amount of entrained hydrocarbons and an upper hydrocarbon phase which contains a minor amount of entrained acid catalyst. The minimum dimension of the random size packing material is 20 to 1000 microns. The bulk density of the material forming the pad is 15–30 lb./ft.³. The temperature in the settler is not particularly critical and is 30 to 60° F., which is about the temperature of the emulsion in the end reactor of the alkylation reactor. The pressure in the settler can be 5 to 60 p.s.i.g. depending on whether or not it is run with a vapor space or completely full. The separated emulsion then passes linearly into a zone containing horizontal traverse baffles in which zone the separation of the entrained acid and hydrocarbon is completed. By the time the acid and hydrocarbon phase reach the end of the settler, there is substantially no acid in the hydrocarbon phase and substantially no hydrocarbon in the acid phase. The acid catalyst is withdrawn from the bottom of the settler and recycled to the reactor and the hydrocarbon is withdrawn from the top of the settler and sent to product treatment and a subsequent fractionation step. The thickness of the pad can be 6 inches to 20 feet or greater and will depend upon the volume throughput of emulsion in the settler. When the pads are over 18 inches thick, it is desirable to put in perforated vertical transverse baffles about every 12 to 24 inches to prevent packing. By the use of the present invention, more efficient and rapid separations of acid-hydrocarbon emulsion can be obtained and existing equipment can be utilized with only slight modification.

Although the invention is particularly described with reference to the alkylation of isobutane with butylenes, in the presence of sulfuric acid as a catalyst, it is not intended that the invention be limited to this particular alkylation reaction, as the same process can be applied to related reactions using other isoparaffins such as isopentane and other olefin such as propllene or amylenes. Likewise, although sulfuric acid is typical of the acid catalyst that may be employed in practicing the invention, it is intended that the invention also be used with other suitable liquid catalysts, including mixtures of sulfuric and phosphoric acids, hydrofluoric acid, aluminum chloride-boron fluoride complexes and the like. Moreover, the invention is not limited to the separation of alkylation emulsions but may likewise be applied to emulsions resulting from acid treating operations, isomerization reactions, and the like.

The nature and objects of the invention will be more readily understood when reference is made to the accompanying drawings in which.

Figure 1:
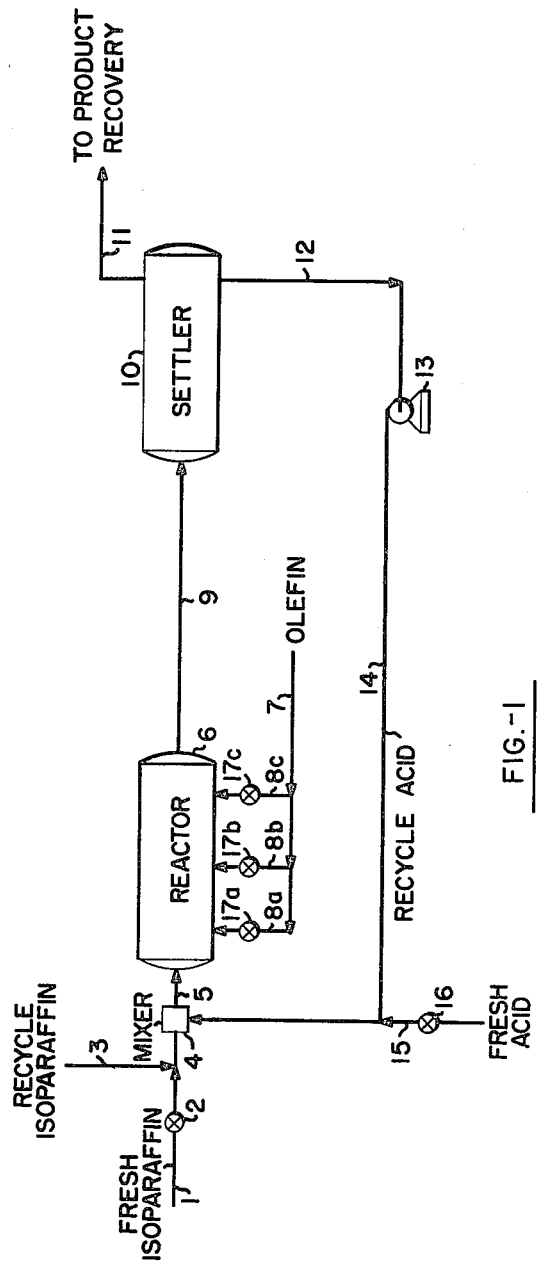
FIGURE 1 is a diagrammatic flow plan for accomplishing the alkylation process of the present invention.

Polytetrahalogenatedethylene polymers that can be used in applicant's invention are characterized by their outstanding chemical resistance, heat stability, strength, and resistance to acid, oxidation, and chemical corrosion. There are two specific commercially available materials which come within this classification. One is Teflon, which is polytetrafluoroethylene polymer. It has no true melting point but undergoes a solid phase transition to a jell at 325° C. with a sharp decrease in strength, and at about 400° C. it decomposes slowly to a gaseous monomer and some gaseous derivatives. It can be molded into pellets of random sizes or machined into random size lathe turnings. It appears waxy, and white or gray in color, however, it is transparent in thin sections. The other polytetrahalogenatedethylene polymer that can be used is Kel-F, which is polytrifluorochloroethylene polymer. It is a colorless material with properties similar to those of Teflon. Both of these materials are characterized by the fact that they are preferentially wet by hydrocarbon and that when they are used in a pad of a random selection of sizes, they effectively and efficiently separate hydrocarbon-acid emulsion into their constituent parts. The use of particles of random sizes appears to enhance the breaking, and rate of settling of the emulsion. This effect is believed to be attributed to the fact that an acid continuous acid-hydrocarbon emulsion contains droplets of hydrocarbon material of a wide selection of sizes. In contacting, for example, a Teflon pad with these hydrocarbon droplets, they appear to more readily adhere to Teflon particles near to their own size to form larger droplets which more rapidly settle out. The random size of the Teflon particles can be 20 to 1000 microns (thickness). Where Teflon shavings are used to form the pad, the width can be up to 0.1 to 2 inches and the length up to .5 to 12 inches. Preferably, shavings up to about .1 to 1 inch in width and about 1 to 4 inches in length are used. Though random size particles with a minimum dimension of about 40 to 60 microns are preferred, particles of 40 to 500 microns can be used. The size of the particles is critical. The effectiveness in settling, however, is dependent to some extent on the intensity of the mixing to which the emulsion it is acting upon has been subjected, and the flow rate. The particles can be random size pellets, turnings, shavings, or irregularly shaped particles. The thickness of the pad used, whether or not one or more pads are used, and the spacing between successive pads will be dependent upon physical condition (e.g., density and tightness) of the emulsion that is to be separated and the volume throughput. The pressure drop between the beginning and end of the area containing the Teflon material should be kept at a minimum so as not to impede the flow of emulsion through the settler. The density of the pad of Teflon material will be such that the pressure drop is at minimum while still maintaining sufficient contact of the emulsion with the Teflon particles to obtain maximum wetting and breaking of the emulsion. Pads of 15 to 30 lb./ft.$^3$ bulk density can be used, while pads of about 20 to 25 lbs./ft.$^3$ bulk density are preferred. In a Teflon pad, for example, of 6 inches to 6 feet in thickness, a pressure drop of 1 to 5 p.s.i.g. can be used. Though a pressure drop of about 3 p.s.i.g. is preferred, pressure differences in the range of .1 to 10 p.i.s.g. can also be used. The pad thickness can be 6 inchs to 2 feet; however, in most conventional settlers presently in use, a pad thickness of about 12 inches is preferred. However, where more than one pad is employed, a thickness of 8 inches to 18 inches with a distance between the pads of about 6 to 24 inches can be used. The temperature in the settler is about 30° to 60° F., preferably about 40° F. Generally, the temperatures are those at which the hydrocarbon emulsion is withdrawn from the reactor. The linear velocity of the emulsion through the Teflon pad and settler is critical and is within the range of .01 to 0.5 f.p.s. Specifically, a linear velocity of about .06 f.p.s. is used, though velocities of .01 to 0.2 f.p.s. can also be used. The linear velocity of the emulsion through the Teflon pad is critical and dependent upon the thickness of the Teflon pad and its volume bulk density. This is illustrated by referring to the volume of emulsion throughput per hour as related to the volume of Teflon pad. For example, rates of 5 to 25 v./v./h. can be used. Generally, rates of 10 to 20 v./v./h. are used, with about 15 v./v./h. being preferred.

The invention will be more particularly described with reference to the alkylation of isobutane and butene in the presence of concentrated sulfuric acid as a catalyst. An understanding of the various aspects of the invention may be had by referring to the accompanying drawings and discussion thereof. These drawings are schematic diagrams showing one arrangement of apparatus which may be used in the practice of one embodiment of the invention. It will be readily appreciated that these drawings are in the nature of diagrams and that various individual pieces of equipment, including fractionating columns, pumps, compressors, and heat exchangers, that will be needed have not been shown.

Referring now to FIGURE 1, the general feature of the alkylation process may be understood.

A reaction vessel 6 is employed which may be of such size as is required by the volume of the material to be handled and by the residence time necessary for effecting the alkylation reaction. Means are provided for introducing the reacting materials into the vessel and for removing reaction products therefrom. It is preferred for proper control of the reaction that the acid and isoparaffin be mixed before entering the reactor. Thus an isobutane feed made up of fresh isobutane entering through line 1, and recycle isobutane entering through line 3 is conducted to a mixing zone 4 where it is mixed with sulfuric acid catalyst. The recycle isobutane is obtained from a product recovery system, which is not shown. The sulfuric acid catalyst enters the mixing zone through fresh acid line 15 and recycle acid line 14. Once the operation has been started, a major supply of acid will be recycle acid from the product settler with small amounts of acid being added through line 15 as needed. The feed rates of fresh isobutane and fresh acid are controlled by valves 2 and 16, respectively.

The mixture of acid and isoparaffin that is prepared in mixing zone 4 is conducted through line 5 into reactor 6 to which a stream of olefins, e.g., butylene, is fed by means of lines 8a, b, and c, the rate of feed being controlled by valves 17a, b, and c. The mixture of acid, isoparaffin and olefin is maintained as an emulsion in reactor 6 by any suitable means, for example, by a mechanical stirrer, by recirculation of the emulsion at high turbulence, or by other means known to the art. Suitable provision may be made to maintain the reaction temperature in the reactor at a desired level, say from 30° to 60° F.

A portion of the emulsion is continuously withdrawn from reactor 6 through line 9 and sent to the product settler 10 which contains packed Teflon shavings of random sizes of 40 to 500 microns (minimum dimension), and which constitutes an important feature of the invention as will be described in detail below. Recycle acid is removed from the settler by line 12 and returned by means of pump 13 through the recycle line 14 to the mixer 4, as previously described. Provisions for removal of spent acid and any vapors that may accumulate have not been shown. These steps can be accomplished in the conventional manner known in the art.

The reaction product leaves the settler through line 11 and is sent through the conventional caustic and water wash steps and a subsequent fractionation step. Isoparaffin recovered from the product is sent back to the reactor through line 3.

Figure 2:
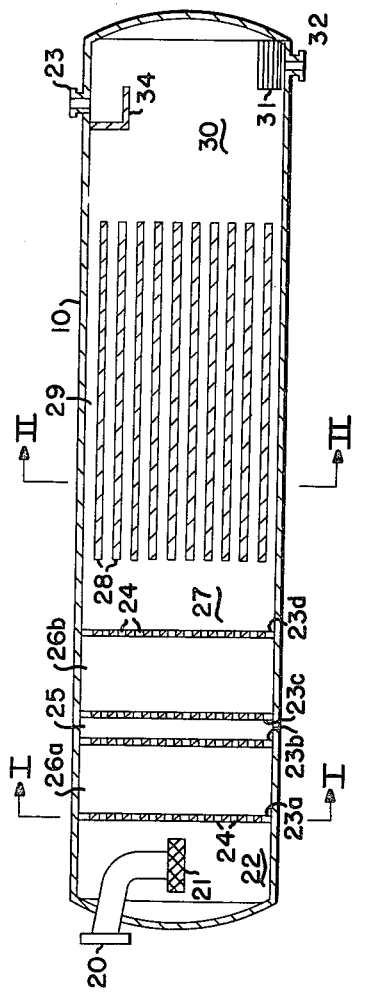
FIGURE 2 is an elevational view of the reaction product settler that is used to carry out the process of this invention.
Figure 3:
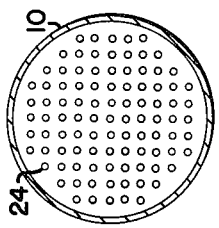
FIGURE 3 is a sectional view taken on line I—I of FIGURE 2.

The important feature of the present invention is the method provided for separating the emulsion into its constituent parts after it leaves the reactor by contacting the emulsion with Teflon or Kel-F. A preferred embodiment of the invention is illustrated by FIGURE 2. Referring now to FIGURE 2, it will be seen that the settler 10 is provided with emulsion breaking zones 26a and 26b comprising pads of packed Teflon lathe turnings, a final settling zone 29 containing horizontal baffles, and a final accumulation zone 30. The settler 10 is a horizontal, cylindrical vessel which when in operation is completely filled with liquid hydrocarbon and acid catalyst. The product emulsion from the reactor enters zone 22 through inlet 20 and velocity arresting cage 21. A vertical partition 23a, positioned adjacent to the inlet end of the vessel combines with the front of the vessel to form the initial emulsion accumulation zone 22. Vertical transverse holdback baffles, 23a, 23b, 23c and 23d, have fluid flow means establishing communication between zones 22 and 27. The latter is defined by holdback baffle 23d and a plurality of flat horizontal settling baffles 28. As shown in FIGURES 2 and 3, the fluid flow means comprises a multitude of openings or passageways 24. These passageways are ¾ inch holes on a 2 square inch pitch which perforate holdback baffles 23a, 23b, 23c and 23d. The holdback baffles can be made from a noncorrosive stainless steel or any other suitable material. Baffles 23a and 23d define zone 26a which is filled with Teflon shavings of random size. When necessary passageway 24 may also have a wide wire mesh screen to retain any of the Teflon shavings that may be forced out of the ¾ inch holes in holdback baffles 23 due to the fluid flow of the acid hydrocarbon emulsion. Zone 25, the preliminary separation zone, is defined by holdback baffles 23b and 23c and provides a zone wherein the broken emulsion is allowed to partly settle. This zone may or may not be present depending on the particular operation. Zone 26b is defined by holdback baffles 23c and 23d which is similar to zone 26a and which is also filled with Teflon shavings of random size. There may be one or more pads of Teflon or one large pad, whichever is required to suit the particular needs of the particular process. The pads contain shavings of random length, width and thickness.

The product emulsion enters zone 22 at a temperature of about 40° F. and a pressure of about 60 p.s.i.g., having a linear velocity through the Teflon pads of about .01 to 0.2 f.p.s. This is equivalent to a flow rate of about 10 to 20 v./v./h. The pad of Teflon shavings is of random size, the minimum dimension being 40 to 500 microns, and having a bulk density of about 20 to 25 lb./ft.$^3$. The emulsion after passing through zones 26a and 26b, through passageways 24, and the respective transverse holdback baffles, enters zone 27 substantially broken into an upper hydrocarbon phase and a lower acid catalyst phase. The entire settler 10 in this embodiment operates filled to capacity with no vapor space at the top. However, this invention may also be used in such cases where there may be a vapor space in the settler in which case it would be operated at about 5 p.s.i.g. The pressure is not critical, and settler can be operated at pressures between 5 and 60 p.s.i.g. depending on whether or not it is operated with a vapor space or completely full.

Figure 4:
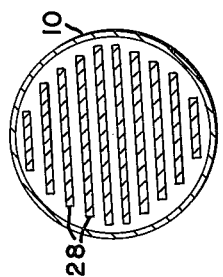
FIGURE 4 is a sectional view taken on line II—II of FIGURE 2.

Further separation between hydrocarbon and acid occurs as the materials flow through the settling zone 29 containing the plurality of essentially horizontal baffles 28. The function of the latter baffles is to shorten the distance that a particle of acid or of hydrocarbon has to travel before encountering a body of the same material with which it can coalesce, thus decreasing the settling time. It will be noted that the baffles 28 are inclined slightly from the horizontal, say about 5 degrees, in the direction of the width of the vessel, as shown in FIGURE 4. This facilitates movement of the separated hydrocarbon and acid layers from between the baffles, the former moving to the high side of the baffles, and the latter to the low side. The hydrocarbon then rises to the top of the vessel in the space between the vessel wall and the high side of the baffles, and the acid flows downward in the opposite space. Instead of having horizontal baffles, the vessel could be entirely filled with Teflon shavings.

Beyond settling zone 29 is final accumulation zone 30, defined by the horizontal baffles 28 and the end of settling vessel 10.

Acid that accumulates in accumulation zone 30 is removed through outlet 32 to be recycled to the lead stage of the reactor system, as previously discussed in connection with FIGURE 1. To minimize agitation in the accumulation zone, an anti-vortex baffle 31 is positioned over the outlet 32. The hydrocarbon product is withdrawn from the accumulation zone 30 through outlet 33. A baffle 34 below outlet 33 minimizes agitation in the accumulation zone. Where the settler is operated full, the level of the interface between separated hydrocarbon and separated acid will be maintained somewhere near the middle of the settler and will be controlled by the rate at which acid and hydrocarbon are withdrawn from zone 30. Linear flow through the settler is maintained by having a slight differential of pressure between the inlet and outlet sides of the settler.

The reaction product removed from outlet 33 is sent to caustic washing and fractionation as is used in conventional practice.

The mechanism by which the separation of acid from hydrocarbon occurs in the operation of the present invention involves a preferential wetting of the polytetrahalogenatedethylene material by the hydrocarbon dispersed in the acid continuous emulsion. The random size of the material is believed to assist in coalescing the random size of dispersed hydrocarbon droplets into droplets which are large enough to rapidly settle out.

The effect of the settling rate brought about by passing the acid-hydrocarbon emulsion through Teflon shavings is clearly shown by the following data that was obtained in the laboratory: scrap Teflon lathe turnings of 50 to 150 microns in thickness, about .1 to .25 inch in width and .5 to 8 inches in length were put into a funnel to form a layer of Teflon shavings. The shavings were of random length, width, and thickness. An acid-hydrocarbon emulsion was prepared by mixing 540 ccs. of reagent grade $H_2SO_4$ and 360 ccs. of plain $C_8$ alkylate in a 5 inch diameter beaker for 60 seconds at 280 r.p.m. The emulsion was then in one case merely put into a 1000 cc. graduate, and in the other case filtered through Teflon shavings into another 1000 cc. graduate, with the results given below:

|  | Normal Settling | Filtered Through Teflon Shavings |
|---|---|---|
| Emulsion Height, In | 12.9 | 12.8 |
| Acid—HC Equilibrium Interface, In | 7.7 | 7.8 |
| Settling Time, Seconds | 554 | 160–200 |

From the above data it can be readily seen that filtering the acid-hydrocarbon emulsion through a layer of Teflon shavings reduces the settling time by two-thirds. It is estimated that implementation of applicant's invention in modified conventional settling equipment would result in substantial improvement in the settling capacity of the equipment.

In another embodiment of the invention, a 24 inch diameter vessel, 20 feet in length, was packed with Teflon lathe turnings of 80 to 500 microns (thickness) and random width and length. A 73 percent acid, acid-hydrocarbon alkylation product emulsion, at a temperature of 40° F. was charged to the vessel at a rate of 22 v./v./h. which represented a linear velocity of about .06 f.p.s. The pressure drop between the front and the rear of the vessel was about 3 p.s.i.g. The pressure in the vessel was about 25 p.s.i.g. The emulsion that entered the vessel was broken and separated into an upper hydrocarbon layer and a lower acid layer. The lower acid layer was recycled to the reactor, and the upper hydrocarbon layer passed to product treatment steps. The vessel had a 3200 b./s.d. settling capacity. On examination it was found that the separation of the emulsion into its constituent parts was substantially complete. By comparsion when operating the same vessel without the Teflon packing, its emulsion settling capacity was observed to be only 500 b./s.d.

It is not intended that the invention be limited to the specific embodiments presented and described herein as many modifications are possible without departing from the scope of the invention defined in the following claims.

What is claimed is:

1. A process for separating an acid-hydrocarbon emulsion into its component parts which comprises contacting said emulsion with particles of polytetrahalogenatedethylene polymer of random length, width, and thickness whereby the rate of separation of hydrocarbon from acid in said emulsion is substantially improved.

2. Process of claim 1 wherein said polymer is polytetrafluoroethylene.

3. Process of claim 1 wherein said polymer is polytrifluorochloroethylene.

4. The process of claim 1 wherein said emulsion is an acid continuous acid-hydrocarbon emulsion and the acid catalyst constitutes more than 50 percent of the emulsion and the flow rate of emulsion to polymer is 5 to 25 v./v./h.

5. The process as defined by claim 1 wherein the linear velocity of the hydrocarbon emulsion through the polytetrafluoroethylene particles of random size is .01 to 0.2 f.p.s.

6. The process of claim 1 wherein the polytetrafluoroethylene particles form a pad of 8 to 18 inches thick.

7. In the process of forming branched chain saturated hydrocarbon by contacting an olefin hydrocarbon with an emulsion of isoparaffinic hydrocarbon and liquid acid catalyst in a confined reaction zone under reaction conditions and withdrawing a portion of said emulsion from said reaction zone, separating reaction product from said withdrawal emulsion and returning catalyst to said reaction zone, the improvement in the separation of liquid catalyst from hydrocarbon which comprises contacting said withdrawn emulsion with a member of the group consisting of polytetrafluoroethylene and polytrifluorochloroethylene polymer of random length, width, and thickness of about 20 to 1000 microns which material is preferentially wet by hydrocarbon, at a flow rate of emulsion to polymer of 10 to 20 v./v./h. and a linear velocity of about .01 to 0.2 f.p.s. wherein the thickness of the halogenated ethylene polymer pad is about 8 to 18 inches and the pressure drop across the pad is 1 to 5 p.s.i.g.

8. The process of claim 7 wherein the temperature in the settler is about 40° F.

9. A process for separating an acid-hydrocarbon emulsion into its component parts which comprises contacting said emulsion with particles of polytetrahalogenatedethylene polymer of random length of 1 to 6 inches, width of 0.1 to 2 inches and thickness of between 200 to 1000 microns, wherein the polymer particles have a bulk density of 20 to 25 lb./ft.$^3$ and are in the form of a pad 6 inches to 6 feet thick.

10. The process of claim 9 wherein the acid-hydrocarbon emulsion is acid continuous and is the product of sulfuric acid catalyzed alkylation reaction.

11. A process for separating an acid-hydrocarbon emulsion containing more than 50 percent by volume acid as a continuous phase and a dispersed hydrocarbon phase into its component parts, which comprises contacting said emulsion with polytetrahalogenated ethylene polymer particles of random length, width and thickness wherein the polymer particles are preferentially wet by the dispersed hydrocarbon phase whereby the rate of separation of the emulsion into its component parts is substantially improved.

12. The process of claim 11 wherein said particles are resistant to chemical attack under the conditions of the separation.

References Cited in the file of this patent

UNITED STATES PATENTS

| 2,399,206 | Castner et al. | Apr. 30, 1946 |
| 2,428,506 | Van der Valk | Oct. 7, 1947 |
| 2,907,717 | Hann | Oct. 6, 1959 |